United States Patent
Wu (10) Patent No.: US 12,026,985 B2
(45) Date of Patent: Jul. 2, 2024

(54) METHOD AND APPARATUS FOR PROCESSING DIAGNOSIS DATA, DIAGNOSIS DEVICE AND SERVER

(71) Applicant: AUTEL INTELLIGENT TECHNOLOGY CORP., LTD., Guangdong (CN)

(72) Inventor: Yinyin Wu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 846 days.

(21) Appl. No.: 17/072,877

(22) Filed: Oct. 16, 2020

(65) Prior Publication Data

US 2021/0035381 A1 Feb. 4, 2021

Related U.S. Application Data

(63) Continuation of application No. PCT/CN2019/129808, filed on Dec. 30, 2019.

(30) Foreign Application Priority Data

Dec. 31, 2018 (CN) .......................... 201811650691.4

(51) Int. Cl.
*H04L 67/12* (2022.01)
*G07C 5/00* (2006.01)
*G07C 5/08* (2006.01)

(52) U.S. Cl.
CPC ............ *G07C 5/008* (2013.01); *G07C 5/0808* (2013.01); *G07C 5/0841* (2013.01); *H04L 67/12* (2013.01)

(58) Field of Classification Search
CPC ....... H04L 67/12; G07C 5/008; G07C 5/0808; G07C 5/0841
See application file for complete search history.

(56) References Cited

U.S. PATENT DOCUMENTS 6,310,888 B1 * 10/2001 Hamlin ..................... H04L 9/40
370/466
10,783,725 B1 * 9/2020 Gaudin .................. G07C 5/008
(Continued)

FOREIGN PATENT DOCUMENTS

| CN | 101753617 A | 6/2010 |
|---|---|---|
| CN | 103095479 A | 5/2013 |

(Continued)

OTHER PUBLICATIONS

International Search Report dated Mar. 26, 2020: PCT/CN2019/129808.

(Continued)

*Primary Examiner* — Viet D Vu (57) ABSTRACT

Embodiments of the present invention relate to a method and an apparatus for processing diagnosis data, a diagnosis device and a server. The method includes: dividing diagnosis data into at least two types of data; respectively encapsulating the at least two types of data into at least two pieces of interface data according to interface data formats; and sending the at least two pieces of interface data to a server respectively through different interfaces, to cause the server to respectively store the at least two pieces of interface data in different cloud databases. In the embodiments of the present invention, diagnosis data is divided into at least two types of data. The at least two types of data are respectively encapsulated into at least two pieces of interface data. The at least two pieces of interface data are sent to the server respectively through different interfaces. In this way, a problem of easily causing loss of a diagnosis history record due to a limited local storage capacity of an automobile diagnosis device can be avoided.

5 Claims, 4 Drawing Sheets

(56) References Cited

U.S. PATENT DOCUMENTS

| | | | | |
|---|---|---|---|---|
| 2008/0312786 A1* | 12/2008 | Day | ................. | G07C 5/008 |
| | | | | 701/31.4 |
| 2013/0073718 A1 | 3/2013 | Kim et al. | | |
| 2014/0074346 A1* | 3/2014 | Chiaverini | ............ | G07C 5/008 |
| | | | | 455/66.1 |
| 2017/0187787 A1* | 6/2017 | Syamala | ................ | H04L 67/12 |
| 2018/0287924 A1* | 10/2018 | Ghosh | ................... | H04L 67/535 |

FOREIGN PATENT DOCUMENTS

| | | | |
|---|---|---|---|
| CN | 103916459 | A | 7/2014 |
| CN | 104765749 | A | 7/2015 |
| CN | 104766024 | A | 7/2015 |
| CN | 105867351 | A | 8/2016 |
| CN | 106254172 | A | 12/2016 |
| CN | 106815337 | A | 6/2017 |
| CN | 107070473 | A | 8/2017 |
| CN | 107092691 | A | 8/2017 |
| CN | 107846468 | A | 3/2018 |
| CN | 108628279 | A | 10/2018 |
| CN | 109710682 | A | 5/2019 |

OTHER PUBLICATIONS

The First Chinese Office Action dated May 25, 2020; Appln. No. 201811650691.4 with English Translation.

Tian Wang: "Design and Implementation of a Service Governance Platform Based on Container Cloud", A Thesis Submitted in Partial Fulillment of the Requirements for the Degree of Juris Master Huazhong University of Science & Technology Wuhan 4730074 P.R. China; Dec. 18, 2018, 52 pages.

* cited by examiner

METHOD AND APPARATUS FOR PROCESSING DIAGNOSIS DATA, DIAGNOSIS DEVICE AND SERVER

This application is a continuation of International Patent Application No. PCT/CN2019/129808 filed on Dec. 30, 2019, which claims priority to Chinese Patent Application No. 201811650691.4 filed on Dec. 31, 2018, both of which are incorporated by reference herein in their entireties.

BACKGROUND

Technical Field

The present application relates to the field of automobile technologies, and in particular, to a method and an apparatus for processing diagnosis data, a diagnosis device and a server.

Related Art

Currently, an automobile diagnosis system for detecting faults and performance of an automobile is applied more widely. The automobile diagnosis system connects an automobile computer and an automobile diagnosis device mainly by using an automobile connection device (such as a vehicle connection interface (VCI) device), and detects and analyzes various diagnosis data parameters of the automobile computer (such as an electronic control unit (ECU)) by using the automobile diagnosis device, to determine a fault cause and a fault component of the automobile. After the diagnosis is finished, the automobile diagnosis device displays a diagnosis result through a display screen, and simultaneously stores the diagnosis result locally as a diagnosis history record, so that a diagnosis result can be quickly obtained with reference to the diagnosis history record during next diagnosis.

In a process of implementing the present invention, the inventor found that at least the following problem exists in the related art: Due to a limited local storage capacity of an automobile diagnosis device, it is impossible to store a relatively large quantity of diagnosis history records, easily causing loss of a diagnosis history record.

SUMMARY

An objective of embodiments of the present invention is to provide a method and an apparatus for processing diagnosis data, a diagnosis device and a server, which can resolve a problem that a diagnosis history record is easily lost.

According to a first aspect, an embodiment of the present invention provides a method for processing diagnosis data, used for a diagnosis device. The method includes:
dividing diagnosis data into at least two types of data;
respectively encapsulating the at least two types of data into at least two pieces of interface data according to interface data formats; and
sending the at least two pieces of interface data to a server respectively through different interfaces, to cause the server to respectively store the at least two pieces of interface data in different cloud databases.

In some embodiments, before the sending the at least two pieces of interface data to a server respectively through different interfaces, the method further includes:
storing the diagnosis data locally; and
sending the at least two pieces of interface data to the server when the diagnosis device is connected to the server through a network.

In some embodiments, the dividing diagnosis data into at least two types of data includes:
dividing the diagnosis data into a diagnosis history record and analysis data.

In some embodiments, the method further includes:
receiving a diagnosis instruction, and performing matching in the local diagnosis history record of the diagnosis device according to the diagnosis instruction; and
if no successfully matched diagnosis history record is obtained, sending the diagnosis instruction to the server, to cause the server to perform matching in diagnosis history records of the server according to the diagnosis instruction.

According to a second aspect, an embodiment of the present invention provides a method for processing diagnosis data, used for a server. The method includes:
receiving, through different interfaces respectively, at least two pieces of interface data sent by a diagnosis device; and
respectively storing the at least two pieces of interface data in different cloud databases according to interfaces respectively corresponding to the at least two pieces of interface data.

In some embodiments, the server is connected to a container, where
the respectively storing the at least two pieces of interface data in different cloud databases according to interfaces respectively corresponding to the at least two pieces of interface data includes:
associating each of the at least two pieces of interface data with one theme according to the interfaces respectively corresponding to the at least two pieces of interface data, and writing the at least two pieces of interface data associated with the themes into the container; and
listening to the container, to obtain the at least two pieces of interface data, and storing the at least two pieces of interface data in different cloud databases according to the themes corresponding to the at least two pieces of interface data.

In some embodiments, the respectively storing the at least two pieces of interface data in different cloud databases according to interfaces respectively corresponding to the at least two pieces of interface data includes:
directly respectively storing, by the server, the at least two pieces of interface data in different cloud databases according to the interfaces respectively corresponding to the at least two pieces of interface data.

In some embodiments, the storing the at least two pieces of interface data in different cloud databases includes:
respectively dividing the at least two pieces of interface data into preset data structures, and storing the divided at least two pieces of interface data in different cloud databases.

In some embodiments, the cloud databases include a first cloud database and a second cloud database, where
the at least two pieces of interface data include a diagnosis history record and analysis data, the diagnosis history record being stored in the first cloud database and the analysis data being stored in the second cloud database, to be used for statistics collection and analysis.

In some embodiments, a preset data structure of the diagnosis history record includes total data and at least one record report corresponding to the total data, where data information of at least one piece of data in the total data is individually stored in a data table, each data table being associated with the total data.

In some embodiments, in the at least one record report, record information of at least one record of the at least one record report is individually stored in a report table, each report table being associated with the at least one record report.

According to a third aspect, an embodiment of the present invention provides an apparatus for processing diagnosis data, used for a diagnosis device. The apparatus includes:
- a data classification module, configured to divide diagnosis data into at least two types of data;
- a data encapsulating module, configured to respectively encapsulate the at least two types of data into at least two pieces of interface data according to interface data formats; and
- a data sending module, configured to send the at least two pieces of interface data to a server respectively through different interfaces, to cause the server to respectively store the at least two pieces of interface data in different cloud databases.

In some embodiments, the apparatus further includes:
- a storage module, configured to store the diagnosis data locally before the at least two pieces of interface data are sent to the server respectively through different interfaces, where
- the data sending module is configured to send the at least two pieces of interface data to the server when the diagnosis device is connected to the server through a network.

In some embodiments, the data classification module is specifically configured to:
- divide the diagnosis data into a diagnosis history record and analysis data.

In some embodiments, the apparatus further includes a diagnosis module, configured to:
- receive a diagnosis instruction, and perform matching in the local diagnosis history record of the diagnosis device according to the diagnosis instruction; and
- if no successfully matched diagnosis history record is obtained, send the diagnosis instruction to the server, to cause the server to perform matching in diagnosis history records of the server according to the diagnosis instruction.

According to a fourth aspect, an embodiment of the present invention provides an apparatus for processing diagnosis data, used for a server. The apparatus includes:
- a data receiving module, configured to receive, through different interfaces respectively, at least two pieces of interface data sent by a diagnosis device; and
- a cloud storage module, configured to respectively store the at least two pieces of interface data in different cloud databases according to interfaces respectively corresponding to the at least two pieces of interface data.

In some embodiments, the server is connected to a container, where
the cloud storage module is specifically configured to:
- associate each of the at least two pieces of interface data with one theme according to the interfaces respectively corresponding to the at least two pieces of interface data, and write the at least two pieces of interface data associated with the themes into the container; and
- listen to the container, to obtain the at least two pieces of interface data, and store the at least two pieces of interface data in different cloud databases according to the themes corresponding to the at least two pieces of interface data.

In some embodiments, the cloud storage module is specifically configured to:
- respectively store, by the server, the at least two pieces of interface data in different cloud databases according to the interfaces respectively corresponding to the at least two pieces of interface data.

In some embodiments, the cloud storage module is specifically configured to:
- respectively divide the at least two pieces of interface data into preset data structures, and store the divided at least two pieces of interface data in different cloud databases.

In some embodiments, the cloud databases include a first cloud database and a second cloud database, where
the at least two pieces of interface data include a diagnosis history record and analysis data, the diagnosis history record being stored in the first cloud database and the analysis data being stored in the second cloud database, to be used for statistics collection and analysis.

In some embodiments, a preset data structure of the diagnosis history record includes total data and at least one record report corresponding to the total data, where
data information of at least one piece of data in the total data is individually stored in a data table, each data table being associated with the total data.

In some embodiments, in the at least one record report, record information of at least one record of the at least one record report is individually stored in a report table, each report table being associated with the at least one record report.

According to a fifth aspect, an embodiment of the present invention provides a diagnosis device. The diagnosis device includes:
- at least one first processor; and
- a first memory, the first memory being in communication connection with the at least one first processor, the first memory storing an instruction executable by the at least one first processor and the instruction being executed by the at least one first processor, to cause the at least one first processor to perform the foregoing method.

According to a sixth aspect, an embodiment of the present invention provides a server. The server includes:
- at least one second processor; and
- a second memory, the second memory being in communication connection with the at least one second processor, the second memory storing an instruction executable by the at least one second processor and the instruction being executed by the at least one second processor, to cause the at least one second processor to perform the foregoing method.

According to a seventh aspect, an embodiment of the present invention provides a non-volatile computer readable storage medium, the computer readable storage medium storing a computer executable instruction, when executed by a processor, the computer executable instruction causing the processor to perform the foregoing method.

In the method and apparatus for processing diagnosis data, the diagnosis device and the server of the embodiments of the present invention, diagnosis data is divided into at least two types of data. The at least two types of data are encapsulated into at least two pieces of interface data. The at least two pieces of interface data are sent to the server respectively through different interfaces. In this way, a problem of easily causing loss of a diagnosis history record due to a limited local storage capacity of an automobile diagnosis device can be avoided.

BRIEF DESCRIPTION OF THE DRAWINGS

One or more embodiments are described by way of example with reference to the corresponding figures in the accompanying drawings, and these exemplary descriptions do not constitute any limitation on the embodiments. Elements in the accompanying drawings that have same reference numerals are represented as similar elements. Unless otherwise particularly stated, the figures in the accompanying drawings are not drawn to scale.

DETAILED DESCRIPTION

In order to make the objectives, technical solutions, and advantages of the present invention clearer, the following clearly describes the technical solutions of embodiments of the present invention with reference to the accompanying drawings of the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

Figure 1:
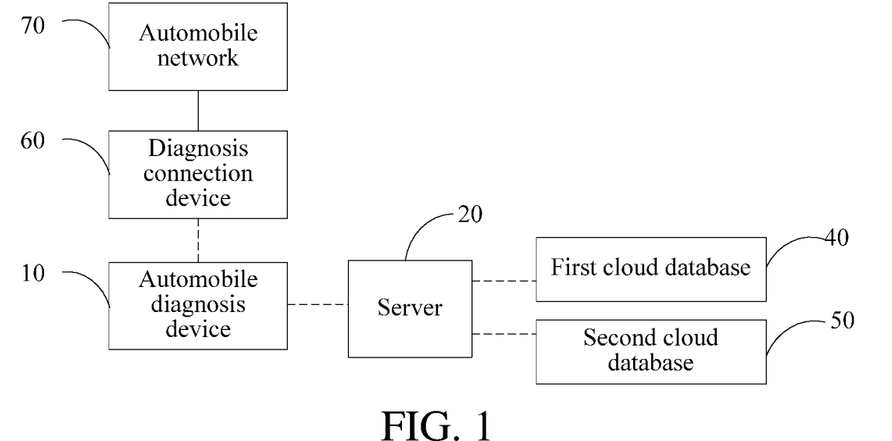
FIG. 1 is a schematic diagram of an application scenario of a method and an apparatus for processing diagnosis data according to an embodiment of the present invention.
Figure 2:
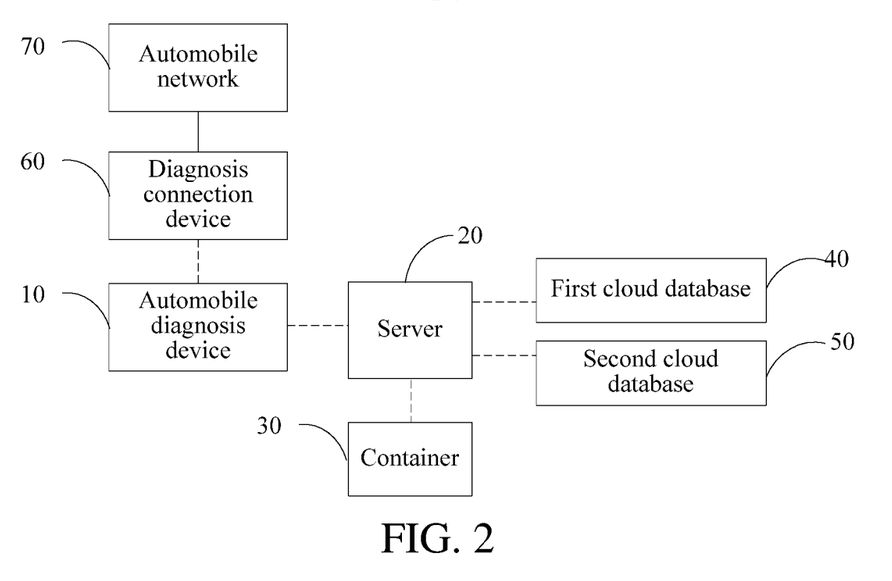
FIG. 2 is a schematic diagram of an application scenario of a method and an apparatus for processing diagnosis data according to an embodiment of the present invention.

A method and an apparatus for processing diagnosis data provided in the embodiments of the present invention are applicable to an automobile diagnosis system shown in FIG. 1 or FIG. 2. The automobile diagnosis system includes a diagnosis device 10, a diagnosis connection device 60 and an automobile network 70. The diagnosis connection device 60 (such as a VCI device) is a bridge of communication between the diagnosis device 10 and the automobile network 70, and is responsible for transmitting a diagnosis instruction of the diagnosis device 10 to the automobile network 70 and transmitting, to the diagnosis device, detection data returned by the automobile network 70 10. The diagnosis device 10 may be connected to the diagnosis connection device 60 in a wired manner, for example, through a communications serial interface or a USB interface, or in a wireless manner, for example, through Bluetooth or Wi-Fi. The diagnosis connection device 60 is connected to the automobile network 70 through a diagnosis interface, such as an on-board diagnostic (OBD) interface.

The diagnosis device 10 is a device that can run diagnosis software, such as a personal computer, a smartphone or a tablet computer, or a specially provided diagnosis device. The automobile network 70 is a to-be-detected object and includes an electronic control module (that is, an automobile computer) of an automobile. Detection data, such as running data and fault code of each part of the automobile can be detected.

The diagnosis software provides a human-computer interaction interface. A user may select a diagnosis function by operating the interface. The diagnosis software converts the diagnosis function selected by the user into a diagnosis instruction, and sends the diagnosis instruction to the automobile network 70 by using the diagnosis connection device 60. The automobile network 70 obtains detection data corresponding to the diagnosis instruction according to the diagnosis instruction, and sends the detection data to the diagnosis device 10 by using the diagnosis connection device 60. The diagnosis software of the diagnosis device 10 parses the detection data fed back by the automobile network 70, obtains a diagnosis result, and presents the diagnosis result to the user through a display screen.

The diagnosis result may be stored locally in the diagnosis device 10 as a diagnosis history record, so that a diagnosis result can be quickly obtained with reference to the diagnosis history record during next diagnosis. Due to a limited local storage capacity of the diagnosis device 10, loss of the diagnosis history record is easily caused. Excessive diagnosis history records also affect running performance of the diagnosis device 10. To avoid the foregoing problems, the diagnosis history record may be stored in a cloud database by using a server 20 located in a cloud. After receiving a diagnosis instruction, the diagnosis device 10 may upload the diagnosis instruction to the server 20. The server 20 performs matching in the diagnosis history record of the cloud database according to the diagnosis instruction.

The diagnosis device 10 may be connected to the server 20 in a wired manner, for example, through a communications serial interface or a USB interface, or in a wireless manner, for example, through Bluetooth or Wi-Fi. In a scenario of wireless connection, in some embodiments, to avoid failing to upload the diagnosis history record because the diagnosis device 10 is disconnected from the server 20, when the diagnosis device 10 is disconnected from the server 20, the diagnosis history record is first stored locally. Then, when the diagnosis device 10 is connected to the server 20 through a wireless network, the diagnosis history record is sent to the server 20. After receiving the diagnosis instruction, the diagnosis device 10 first performs matching in the local diagnosis history record of the diagnosis device 10 according to the diagnosis instruction, and if no successfully matched diagnosis history record is obtained, the diagnosis device 10 then sends the diagnosis instruction to the server 20. The server 20 performs matching in diagnosis history record of the cloud database according to the diagnosis instruction.

The cloud database may include one database or at least two databases (in FIG. 1 and FIG. 2, an example that a first cloud database 40 and a second cloud database 50 are included is used for description). The at least two databases may be integrated in the server 20, or may be individually set. Alternatively, some databases are integrated in the server 20 and some databases are individually set. Different databases may be configured to store different types of data, to meet various requirements of the user. For example, in the embodiments shown in FIG. 1 and FIG. 2, the first cloud database 40 may be configured to store the diagnosis history record, and the second cloud database 50 may be configured to store analysis data.

The diagnosis history record includes, for example, vehicle basic information, customer information, fault code, a data flow, ECU information, tire pressure monitoring information, a vehicle identification number (VIN) and a service and maintenance record. The diagnosis history record may help obtain a diagnosis result more quickly during new diagnosis. For example, for diagnosis of a same vehicle model, during the new diagnosis, only a VIN needs to be input to perform matching in the diagnosis history record, and then diagnosis data matching the VIN can be obtained, so that a diagnosis result can be quickly obtained. The analysis data includes, for example, a user behavior track, diagnosis device information and diagnosis software version information. Based on the analysis data, analysis and calculation may be performed, for performing product-level market big data analysis in the industry, and providing real and effective data support for related decisions such as market positioning of a product in the industry and a user behavior.

By setting the first cloud database 40 for storing the diagnosis history record and the second cloud database 50 for storing the analysis data, a user can search a corresponding database according to a data requirement of the user, a search speed being high. In addition, the diagnosis history record and the analysis data are separately stored, which can meet a main data requirement of the user.

In some embodiments, referring to FIG. 2, to improve running efficiency and increase a running speed, a container 30 is further disposed in the cloud. The container 30 is, for example, a Kafka cluster server. Kafka is a high-throughput distributed system for message publishing and subscription, and can process all action data flows in a customer-scale website. The Kafka cluster server includes at least one Kafka server. The Kafka server has a message producer responsible for publishing a message to the Kafka server and a message consumer configured to read a message (that is, consume a message) from the Kafka server. After receiving diagnosis data (for example, the diagnosis history record and the analysis data) of the diagnosis device 10, the server 20 may transmit the diagnosis data to the Kafka server by using the producer. Further, the consumer reads the diagnosis data. The server 20 obtains the diagnosis data by performing data monitoring on the consumer, and then stores the diagnosis data in a cloud database.

In the embodiment shown in FIG. 2, that the cloud database includes a first cloud database 40 and a second cloud database 50 and the diagnosis data includes the diagnosis history record and the analysis data is used an example for description. For a process in which the server 20 obtains different types of data by using the container 30, refer to FIG. 3. Collected data A indicates the diagnosis history record, and collected data B indicates the analysis data. The diagnosis device 10 may upload the diagnosis history record and the analysis data through different application programming interfaces (API) (for example, a software interface 1 and a software interface 2). The server 20 receives the diagnosis history record and the analysis data, that is, the collected data A and the collected data B in FIG. 3, through different software interfaces. To distinguish between different data, the server 20 associates the collected data A with a theme A and associates the collected data B with a theme B. Then, the data associated with the themes is transmitted to the Kafka server by using the producer. The consumer consumes the data associated with the themes. The server 20 obtains the data by listening to the consumer. The server 20 obtains the collected data A and the collected data B respectively according to the themes corresponding to the data, and then stores the collected data A in the first cloud database 40 and stores the collected data B in the second cloud database 50.

Figure 3:
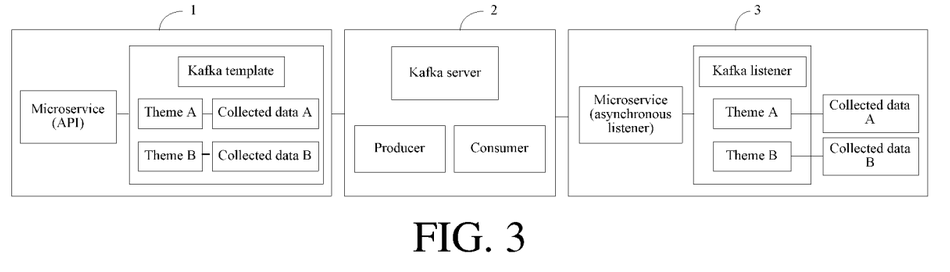
FIG. 3 is a schematic diagram of a process in which a server stores data by using a container according to an embodiment of the present invention.

In FIG. 3, functions of a module 1 and a module 3 are implemented by the server 20, and a function of a module 2 is implemented by the container 30. In an actual application, the server 20 may associate different types of data with themes by using a Kafka template. That the server 20 obtains the diagnosis data through a listening function may be implemented by using a Kafka listener. In the Kafka cluster server, physically, messages with different themes are stored separately. Logically, although a message with one theme is stored in one or more Kafka servers, a user only needs to specify the theme of the message to produce or consume the data, without needing to care about a location in which the data is stored. The Kafka cluster server belongs to the prior art. For a specific function of the Kafka cluster server, refer to the prior art.

It should be noted that, in addition to the automobile diagnosis system, the diagnosis device 10 may further be applied to a diagnosis system of another device.

Figure 4:
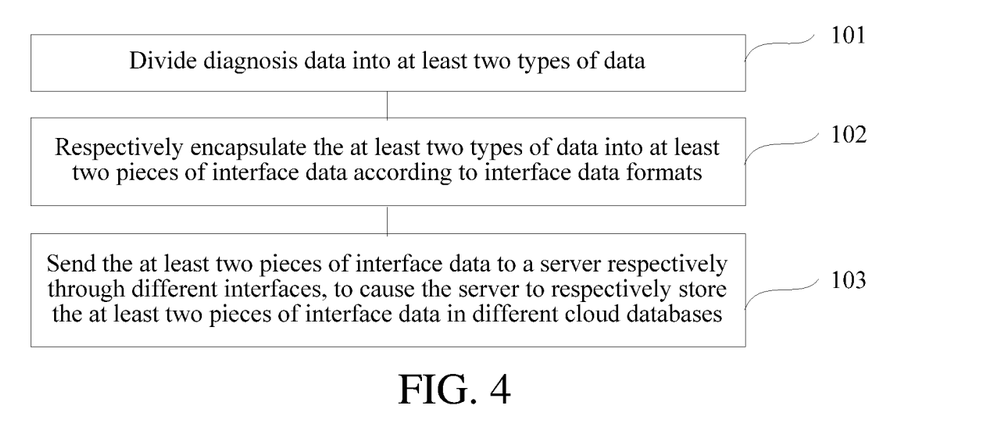
FIG. 4 is a schematic flowchart of an embodiment of a method for processing diagnosis data on a diagnosis device side according to the present invention.

FIG. 4 is a schematic flowchart of a method for processing diagnosis data according to an embodiment of the present invention. The method may be performed by the diagnosis device 10 in FIG. 1 or FIG. 2. As shown in FIG. 4, the method for processing diagnosis data includes:

101. Divide diagnosis data into at least two types of data.

A type of the data may be set according to an application requirement of a user. In some embodiments, the diagnosis data includes a diagnosis history record and analysis data.

102. Respectively encapsulate the at least two types of data into at least two pieces of interface data according to interface data formats.

103. Send the at least two pieces of interface data to a server respectively through different interfaces, to cause the server to respectively store the at least two pieces of interface data in different cloud databases.

To enable a server 20 to distinguish between types of data after the diagnosis data is uploaded to the server 20, the diagnosis device 10 uploads the data through different interfaces. Therefore, before uploading the diagnosis data, the diagnosis device 10 first encapsulates, according to the types of the data in the diagnosis data and according to data interface formats, each type of data into interface data suitable for transmission through the interface. Then, the diagnosis data is uploaded to the server 20 through different interfaces. After receiving the diagnosis data, the server 20 may distinguish between data types according to the interfaces of the received data, and respectively stores the different types of data in different cloud databases according to the data types, helping a user search a corresponding cloud database for data according to a requirement of the user. The interface is a software interface.

Uploading the diagnosis data to the server 20 located in a cloud can resolve a problem that the locally stored diagnosis data is easily lost, and can avoid running performance degradation caused because the diagnosis device 10 locally stores excessive diagnosis data. In addition, after the diagnosis data is uploaded to the server 20, the diagnosis data may be applied by different diagnosis devices. For a same user, after a same account is used to log in different diagnosis devices, the diagnosis data stored in the cloud databases may be obtained.

When the diagnosis data includes the diagnosis history record, after receiving the diagnosis instruction again, the diagnosis device 10 first performs matching in the local diagnosis history record of the diagnosis device according to the diagnosis instruction, and if no successfully matched diagnosis history record is obtained, the diagnosis device 10 sends the diagnosis instruction to the server. The server performs matching in diagnosis history records of the cloud databases according to the diagnosis instruction.

In some scenarios, the diagnosis device 10 may be disconnected from the server 20 (for example, when the diagnosis device 10 is connected to the server 20 through a Wi-Fi network, a failure occurs in the Wi-Fi network). To avoid failing to upload the diagnosis data to the cloud databases caused by the disconnection, the diagnosis device 10 first stores the diagnosis data locally. When the diagnosis device is connected to the server through a network, the at least two pieces of interface data are sent to the server.

Figure 5:
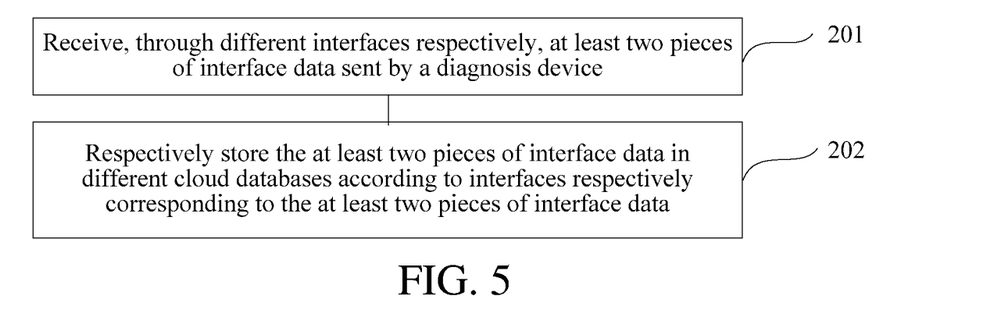
FIG. 5 is a schematic flowchart of an embodiment of a method for processing diagnosis data on a server side according to the present invention.

FIG. 5 is a schematic flowchart of a method for processing diagnosis data according to an embodiment of the present invention. The method may be performed by the server 20 in FIG. 1 or FIG. 2. As shown in FIG. 5, the method for processing diagnosis data includes:

201. Receive, through different interfaces respectively, at least two pieces of interface data sent by a diagnosis device.

202. Respectively store the at least two pieces of interface data in different cloud databases according to interfaces respectively corresponding to the at least two pieces of interface data.

The at least two pieces of interface data sent by the diagnosis device are received through different interfaces, data types are distinguished according to the interfaces of the received data and different types of data are respectively stored in different cloud databases according to the data types. In some embodiments, after distinguishing between the data types, the server 20 may directly respectively store different types of data in different cloud databases. For example, a diagnosis history record is stored in a first cloud database, and analysis data is stored in a second cloud database.

In some other embodiments, the server stores data by using a container 30. Specifically, after receiving the at least two pieces of interface data through different software interfaces, the server associates each of the at least two pieces of interface data with one theme (for example, sets one label for each piece of interface data) according to the interfaces respectively corresponding to the at least two pieces of interface data, and writes the at least two pieces of interface data associated with the themes into the container. Then, the server listens to the container, to obtain the at least two pieces of interface data, and stores the at least two pieces of interface data in different cloud databases according to the themes corresponding to the at least two pieces of interface data.

The container 30 is, for example, a Kafka cluster server. The Kafka cluster server includes at least one Kafka server. In an actual application, the server 20 may associate the at least two pieces of interface data with themes by using a Kafka template, and transmit the interface data to the Kafka server by using a producer of the Kafka server. Further, a consumer reads the at least two pieces of interface data from the Kafka server. The server 20 listens to the consumer by using a Kafka listening function, to obtain the at least two pieces of interface data.

In some embodiments, before storing the diagnosis data in the cloud databases, the server 20 first divides the interface data into preset data structures, and then the server 20 stores the data in the cloud databases, to facilitate data retrieval in the cloud databases. When the diagnosis data includes a diagnosis history record and analysis data, interface data corresponding to the diagnosis history record is divided into a preset data structure of the diagnosis history record, and interface data corresponding to the analysis data is divided into a preset data structure of the analysis data. In some embodiments, when stored locally in the diagnosis device and stored in the cloud databases, the diagnosis history record has a same data structure, to facilitate data retrieval.

In some embodiments, the preset data structure of the diagnosis history record includes total data. The total data records a plurality of data items. Data information of each data item is individually stored in a data table. Each data table is associated with the total data. The data items include tire pressure monitoring data, vehicle owner data, diagnosis device data, vehicle diagnosis data and a vehicle data flow. The total data corresponds to a plurality of record reports (such as a tire pressure monitoring report and a service report). Each record report may further be divided into a plurality of record items. Record information of each report item is individually stored in a report table. Each report table is associated with the record report. The record items obtained through division of the record report include, for example, VIN information, ECU information and fault code information. Each data item and each record item are stored separately, and also maintain a logic relationship between each other, thereby improving data processing efficiency of the server and the diagnosis device.

Figure 6:
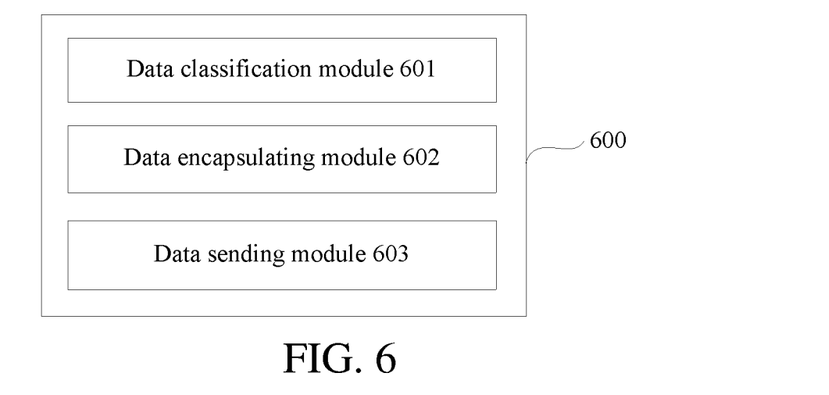
FIG. 6 is a schematic structural diagram of an embodiment of an apparatus for processing diagnosis data on a diagnosis device side according to the present invention.

Accordingly, an embodiment of the present invention further provides an apparatus for processing diagnosis data, which may be used for the diagnosis device 10 in FIG. 1 or FIG. 2. As shown in FIG. 6, an apparatus 600 for processing diagnosis data includes:

a data classification module 601, configured to divide diagnosis data into at least two types of data;

a data encapsulating module 602, configured to respectively encapsulate the at least two types of data into at least two pieces of interface data according to interface data formats; and a data sending module 603, configured to send the at least two pieces of interface data to a server respectively through different interfaces, to cause the server to respectively store the at least two pieces of interface data in different cloud databases.

In this embodiment of the present invention, diagnosis data is divided into at least two types of data. The at least two types of data are encapsulated into at least two pieces of interface data. The at least two pieces of interface data are sent to the server respectively through different interfaces. In this way, a problem of easily causing loss of a diagnosis history record due to a limited local storage capacity of an automobile diagnosis device can be avoided.

Figure 7:
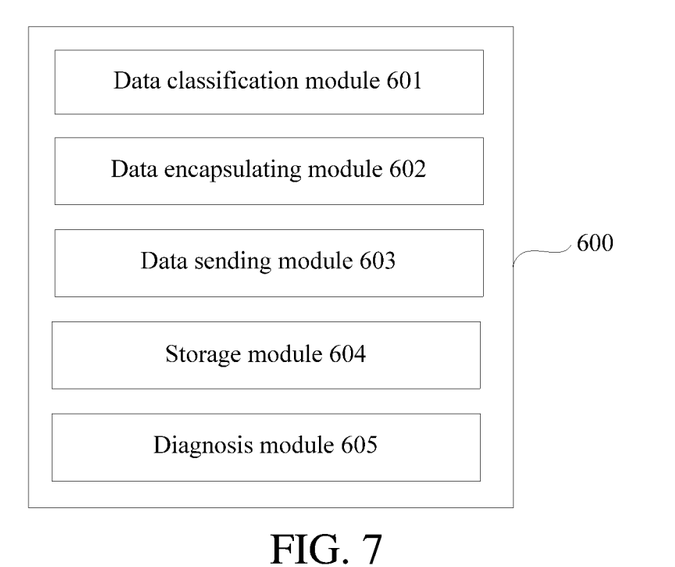
FIG. 7 is a schematic structural diagram of an embodiment of an apparatus for processing diagnosis data on a diagnosis device side according to the present invention.

In some embodiments, referring to FIG. 7, the apparatus 600 for processing diagnosis data further includes:

a storage module 604, configured to store the diagnosis data locally before the at least two pieces of interface data are sent to the server respectively through different interfaces, where the data sending module is configured to send the at least two pieces of interface data to the server when the diagnosis device is connected to the server through a network.

In some embodiments, the data classification module 601 is specifically configured to:

divide the diagnosis data into a diagnosis history record and analysis data.

In some embodiments, referring to FIG. 7, the apparatus 600 for processing diagnosis data further includes a diagnosis module 605, configured to:

receive a diagnosis instruction, and perform matching in the local diagnosis history record of the diagnosis device according to the diagnosis instruction; and if no successfully matched diagnosis history record is obtained, send the diagnosis instruction to the server, to cause the server to perform matching in diagnosis history records of the cloud databases according to the diagnosis instruction.

It should be noted that, the foregoing apparatus may perform the method provided in the embodiments of the present application, and has a corresponding functional module performing the method and a beneficial effect. For technical details that are not described in the apparatus embodiments, refer to the method provided in the embodiments of the present application.

Figure 8:
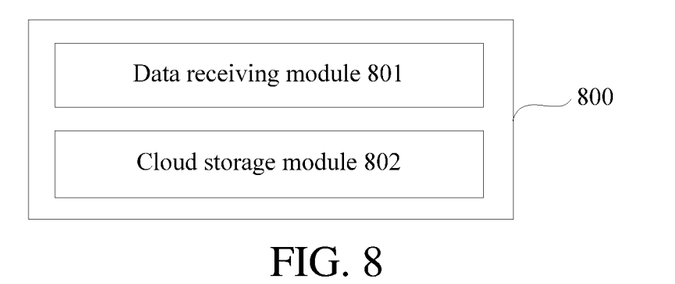
FIG. 8 is a schematic structural diagram of an embodiment of an apparatus for processing diagnosis data on a server side according to the present invention.

An embodiment of the present invention further provides an apparatus for processing diagnosis data, which may be used for the server 20 in FIG. 1 or FIG. 2. As shown in FIG. 8, an apparatus 800 for processing diagnosis data includes:

a data receiving module 801, configured to receive, through different interfaces respectively, at least two pieces of interface data sent by a diagnosis device; and a cloud storage module 802, configured to respectively store the at least two pieces of interface data in different cloud databases according to interfaces respectively corresponding to the at least two pieces of interface data.

In some embodiments, the server is connected to a container, where the cloud storage module 802 is specifically configured to:

associate each of the at least two pieces of interface data with one theme according to the interfaces respectively corresponding to the at least two pieces of interface data, and write the at least two pieces of interface data associated with the themes into the container; and listen to the container, to obtain the at least two pieces of interface data, and store the at least two pieces of interface data in different cloud databases according to the themes corresponding to the at least two pieces of interface data.

In some embodiments, the cloud storage module 802 is specifically configured to:

directly respectively store, by the server, the at least two pieces of interface data in different cloud databases according to the interfaces respectively corresponding to the at least two pieces of interface data.

In some embodiments, the cloud storage module 802 is specifically configured to:

respectively divide the at least two pieces of interface data into preset data structures, and store the divided at least two pieces of interface data in different cloud databases.

In some embodiments, the cloud databases include a first cloud database and a second cloud database, where the at least two pieces of interface data include a diagnosis history record and analysis data, the diagnosis history record being stored in the first cloud database and the analysis data being stored in the second cloud database, to be used for statistics collection and analysis.

In some embodiments, a preset data structure of the diagnosis history record includes total data and at least one record report corresponding to the total data, where data information of at least one piece of data in the total data is individually stored in a data table, each data table being associated with the total data.

In some embodiments, in the at least one record report, record information of at least one record of the at least one record report is individually stored in a report table, each report table being associated with the at least one record report.

Figure 9:
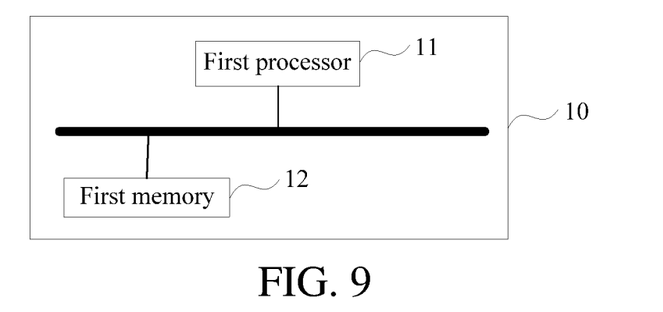
FIG. 9 is a schematic diagram of a hardware structure of an embodiment of a diagnosis device according to the present invention.

FIG. 9 is a schematic diagram of a hardware structure of a diagnosis device 10. As shown in FIG. 9, the diagnosis device 10 includes:

one or more first processors 11 and a first memory 12. In FIG. 9, for example, the diagnosis device 10 includes one first processor 11.

The first processor 11 may be connected to the first memory 12 through a bus or in other manners. In FIG. 9, as an example, the connection is performed through a bus.

As a non-volatile computer readable storage medium, the first memory 12 may be configured to store a non-volatile software program and a non-volatile computer executable program and module, for example, a program instruction/module (such as the data classification module 601, the data encapsulating module 602 and the data sending module 603 shown in FIG. 6) corresponding to the method for processing diagnosis data on the diagnosis device side in the embodiments of the present application. The first processor 11 runs the non-volatile software program, instruction and module stored in the first memory 12, to perform various functional applications of the diagnosis device and data processing, that is, to implement the method for processing diagnosis data on the diagnosis device side in the foregoing method embodiments.

The first memory 12 may include a program storage area and a data storage area. The program storage area may store an operating system and an application program that is required by at least one function. The data storage area may store data created according to use of a controller and the like. In addition, the first memory 12 may include a high speed random access memory, and may further include a non-volatile memory, such as at least one magnetic disk storage device, a flash memory, or another non-volatile solid-state storage device. In some embodiments, the first memory 12 may optionally include memories remotely disposed relative to the first processor 11. These remote memories may be connected to the diagnosis device through a network. Instances of the network include, but are not limited to, the Internet, an intranet, a local area network, a mobile communications network and a combination thereof.

The one or more modules are stored in the first memory 12, and when executed by the one or more first processors 11, perform the method for processing diagnosis data on the diagnosis device side in any of the foregoing method embodiments, for example, perform step 101 to step 103 in the foregoing described method in FIG. 4, to implement functions of the modules 601 to 603 in FIG. 6 and the modules 601 to 605 in FIG. 7.

Figure 10:
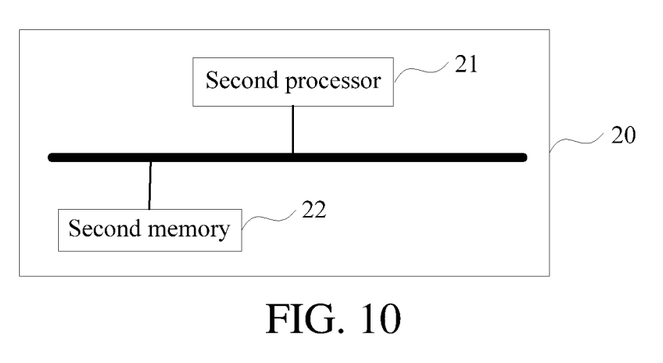
FIG. 10 is a schematic diagram of a hardware structure of an embodiment of a server according to the present invention.

FIG. 10 is a schematic diagram of a hardware structure of a server 20. As shown in FIG. 10, the server 20 includes:

one or more second processors 21 and a second memory 22. In FIG. 10, for example, the server 20 includes one second processor 21.

The second processor 21 may be connected to the second memory 22 through a bus or in other manners. In FIG. 10, for example, the connection is performed through a bus.

As a non-volatile computer readable storage medium, the second memory 22 may be configured to store a non-volatile software program and a non-volatile computer executable program and module, for example, a program instruction/module (such as the data receiving module 801 and the cloud storage module 802 shown in FIG. 8) corresponding to the method for processing diagnosis data on the server side in the embodiments of the present application. The second processor 21 runs the non-volatile software program, instruction and module stored in the second memory 22, to perform various functional applications of the server and data processing, that is, to implement the method for processing diagnosis data in the foregoing method embodiments.

The second memory 22 may include a program storage area and a data storage area. The program storage area may store an operating system and an application program that is required by at least one function. The data storage area may store data created according to use of a controller and the like. In addition, the second memory 22 may include a high speed random access memory, and may further include a non-volatile memory, such as at least one magnetic disk storage device, a flash memory, or another non-volatile solid-state storage device. In some embodiments, the second memory 22 may optionally include memories remotely disposed relative to the second processor 21. These remote memories may be connected to the server through a network. Instances of the network include, but are not limited to, the Internet, an intranet, a local area network, a mobile communications network and a combination thereof.

The one or more modules are stored in the second memory 22, and when executed by the one or more second processors 21, perform the method for processing diagnosis data on the diagnosis device side in any of the method embodiments, for example, perform step 201 to step 202 in the foregoing described method in FIG. 5, to implement functions of the modules 801 to 602 in FIG. 8.

The foregoing product may perform the method provided in the embodiments of the present application, and has a corresponding functional module performing the method and a beneficial effect. For technical details that are not described in this embodiment, refer to the method provided in the embodiments of the present application.

An embodiment of the present application provides a non-volatile computer readable storage medium. The computer readable storage medium stores a computer executable instruction. The computer executable instruction, when executed by one or more processors, for example, the first processor 11 in FIG. 9 or the second processor 21 in FIG. 10, causes the one or more processors to perform the method for processing diagnosis data in any of the foregoing method embodiments, for example, perform step 101 to step 103 in the foregoing described method in FIG. 4 and step 201 to step 202 in the method in FIG. 5, to implement the modules 601 to 603 in FIG. 6, the modules 601 to 605 in FIG. 7 and the modules 801 to 802 in FIG. 8.

The apparatus embodiments described above are merely schematic. The units described as separate parts may be or may not be physically apart. The parts displayed as units may be or may not be physical units, in other words, may be located at a same place, or may be distributed onto a plurality of network units. Some or all modules thereof may be selected based on an actual requirement, to implement an objective of the solution in this embodiment.

Through the description of the foregoing embodiments, persons of ordinary skill in the art may clearly understand that the embodiments may be implemented by software in combination with a universal hardware platform, and may certainly be implemented by hardware. Persons of ordinary skill in the art may understand that all or some of the procedures of the methods of the foregoing embodiments may be implemented by a computer program instructing relevant hardware. The program may be stored in a computer readable storage medium. When the program is executed, the procedures of the embodiments of the foregoing methods may be performed. The foregoing storage medium may include: a magnetic disk, an optical disc, a read-only memory (ROM), or a random access memory (RAM).

It should be finally noted that the foregoing embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for processing diagnosis data, used for a server, wherein the method comprises:
   receiving, through different interfaces respectively, at least two pieces of interface data sent by a diagnosis device; wherein one piece of interface data is received at one interface while other piece of interface data is received at the other interface; and
   distinguishing data types according to the interfaces of the at least two pieces of interface data; and respectively storing the at least two pieces of interface data in different cloud databases according to data types corresponding to the at least two pieces of interface data;
   the server is connected to a container, wherein:
      the respectively storing the at least two pieces of interface data in different cloud databases according to interfaces respectively corresponding to the at least two pieces of interface data comprises:
      associating each of the at least two pieces of interface data with one theme according to the interfaces respectively corresponding to the at least two pieces of interface data, and writing the at least two pieces of interface data associated with the themes into the container; and
      listening to the container, to obtain the at least two pieces of interface data, and storing the at least two pieces of interface data in different cloud databases according to the themes corresponding to the at least two pieces of interface data.

2. The method for processing diagnosis data according to claim 1, wherein the storing the at least two pieces of interface data in different cloud databases comprises:

respectively dividing the at least two pieces of interface data into preset data structures, and storing the divided at least two pieces of interface data in different cloud databases.

3. The method for processing diagnosis data according to claim 2, wherein the cloud databases comprise a first cloud database and a second cloud database, wherein the at least two pieces of interface data comprise a diagnosis history record and analysis data, the diagnosis history record being stored in the first cloud database and the analysis data being stored in the second cloud database, to be used for statistics collection and analysis.

4. The method for processing diagnosis data according to claim 3, wherein a preset data structure of the diagnosis history record comprises total data and at least one record report corresponding to the total data, wherein data information of at least one piece of data in the total data is individually stored in a data table, each data table being associated with the total data.

5. The method for processing diagnosis data according to claim 4, wherein in the at least one record report, record information of at least one record of the at least one record report is individually stored in a report table, each report table being associated with the at least one record report.

* * * * *